(12) United States Patent
Rupp et al.

(10) Patent No.: US 9,329,368 B2
(45) Date of Patent: *May 3, 2016

(54) BEAM SHAPING UNIT FOR FOCUSING A LASER BEAM

(71) Applicant: TRUMPF Werkzeugmaschinen GmbH + Co. KG, Ditzingen (DE)

(72) Inventors: Thomas Rupp, Ludwigsburg (DE); Jens Braun, Stuttgart (DE); Dominik Vees, Tuebingen (DE); Juergen-Michael Weick, Asperg (DE); Dieter Burger, Vaihingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/317,809

(22) Filed: Jun. 27, 2014

(65) Prior Publication Data

US 2014/0307312 A1 Oct. 16, 2014

Related U.S. Application Data

(63) Continuation of application No. 13/657,170, filed on Oct. 22, 2012, now Pat. No. 8,804,238, which is a continuation of application No. PCT/EP2011/055853, filed on Apr. 13, 2011.

(30) Foreign Application Priority Data

Apr. 22, 2010 (DE) ...................... 20 2010 006 047 U

(51) Int. Cl.
*G02B 15/14* (2006.01)
*B23K 26/04* (2014.01)
(Continued)

(52) U.S. Cl.
CPC .............. *G02B 15/14* (2013.01); *B23K 26/046* (2013.01); *B23K 26/073* (2013.01); *B23K 26/14* (2013.01); *B23K 26/38* (2013.01); *G02B 27/09* (2013.01); *G02B 7/08* (2013.01)

(58) Field of Classification Search
CPC .......... G02B 15/14; G02B 27/09; G02B 7/08; B23K 26/046; B23K 26/073; B23K 26/14; B23K 26/38
USPC .......................... 359/432, 513, 808, 822, 823; 219/121.75
See application file for complete search history.

(56) References Cited

U.S. PATENT DOCUMENTS 5,660,748 A  8/1997  Tanaka et al.
5,978,148 A * 11/1999  Oono et al. .................... 359/668
(Continued)

FOREIGN PATENT DOCUMENTS

CN        1286654      3/2001
DE       19701516     2/1998
(Continued)

OTHER PUBLICATIONS

International Search Report for corresponding PCT Application No. PCT/EP2011/055853, mailed Jul. 22, 2011, 6 pages.
(Continued)

*Primary Examiner* — Frank Font
(74) *Attorney, Agent, or Firm* — Fish & Richardson P.C.

(57) ABSTRACT

A beam shaping unit for focusing a divergent laser beam includes a first optical element to receive the laser beam, a second optical element to receive the beam from the first optical element, an optical focusing unit to receive the beam from the second optical element, a first focal point adjustment device coupled to the first optical element, the first focal point adjustment device being configured to adjust the beam focal point diameter by manipulating the first optical element, and a second focal point adjustment device coupled to the second optical element, the second focal point adjustment device being configured to adjust, in the beam propagation direction, the beam focal position by manipulating the second optical element, and in which the beam shaping unit is configured to image the beam from the first optical element through an intermediate focal point onto the second optical element.

9 Claims, 2 Drawing Sheets

(51) Int. Cl.
  *B23K 26/073* (2006.01)
  *B23K 26/14* (2014.01)
  *B23K 26/38* (2014.01)
  *G02B 27/09* (2006.01)
  *G02B 7/08* (2006.01)

(56) References Cited

U.S. PATENT DOCUMENTS

| | | | |
|---|---|---|---|
| 6,124,565 | A | 9/2000 | Morishita et al. |
| 6,353,203 | B1 | 3/2002 | Hokodate et al. |
| 2003/0138203 | A1* | 7/2003 | Imakado et al. ............... 385/33 |
| 2005/0061789 | A1 | 3/2005 | Nagai et al. |
| 2006/0245084 | A1 | 11/2006 | Brustle et al. |
| 2009/0184234 | A1* | 7/2009 | Shindo et al. ................ 250/206 |
| 2011/0042360 | A1* | 2/2011 | Takahashi et al. ....... 219/121.62 |
| 2011/0127697 | A1* | 6/2011 | Milne .......................... 264/400 |
| 2011/0147351 | A1* | 6/2011 | Miyazaki et al. ........ 219/121.71 |

FOREIGN PATENT DOCUMENTS

| | | |
|---|---|---|
| DE | 19825092 | 12/1999 |
| DE | 102008048502 | 4/2010 |
| EP | 1057578 A2 | 12/2000 |
| EP | 1643284 | 4/2006 |
| JP | 60108190 | 6/1985 |
| JP | 63316816 | 12/1988 |
| JP | 1005694 | 1/1989 |
| JP | 08197274 A | 8/1996 |
| JP | 08238586 | 9/1996 |
| JP | 10202385 | 8/1998 |
| JP | 2000334585 A | 12/2000 |
| JP | 2003517931 | 6/2003 |
| JP | 2005088053 | 4/2005 |
| JP | 2006015399 A | 1/2006 |
| JP | 2009166104 | 7/2009 |
| JP | 2009226473 | 10/2009 |
| KR | 1020010033637 | 4/2001 |
| KR | 1020070057066 | 6/2007 |
| WO | 0138036 | 5/2001 |
| WO | 0139920 | 6/2001 |

OTHER PUBLICATIONS

Notification of Transmittal of Translation if the International Preliminary Report on Patentability for corresponding PCT Application No. PCT/EP2011/055853, mailed Nov. 1, 2012, 7 pages.

* cited by examiner

BEAM SHAPING UNIT FOR FOCUSING A LASER BEAM

CROSS REFERENCE TO RELATED APPLICATIONS

This application is a continuation of and claims priority under 35 U.S.C. §120 to U.S. application Ser. No. 13/657,170, filed on Oct. 22, 2012, which is a continuation of PCT Application No. PCT/EP2011/055853 filed on Apr. 13, 2011, which claims priority to German Application No. 20 2010 006 047.8, filed on Apr. 22, 2010. The contents of all these priority applications are hereby incorporated by reference in their entirety.

TECHNICAL FIELD

The present disclosure relates to beam shaping units for focusing a laser beam during laser material processing and to methods for controlling such beam shaping units.

BACKGROUND

In laser material processing operations, the laser beam is repeatedly adapted to different processes and applications. In addition to adjusting a required power level, adjustment of a focal point diameter and a focal position of the laser beam may also be significant. In many cases, e.g., when changing from thin to thick sheet metal sheets or from thick to thin metal sheets during laser cutting, the foregoing adjustments require a change of the optical processing unit, or even the entire processing head. The set-up times connected with such changes reduce the productivity of the laser processing systems used.

In order to adjust various focal point diameters at an operating point with a minimum beam diameter of a laser beam, JP 2009226473 discloses a device and a method in which a divergent laser beam first strikes a displaceable collimating lens. The focal point diameter, which is imaged onto a workpiece by means of an optical focusing unit arranged downstream in the beam propagation direction, can be adjusted by changing the position of the collimating lens in the beam propagation direction, i.e., along the laser beam axis. However, as a result of this diameter change, the focal position is also affected such that the focal position has to be adjusted in order to keep a constant operating point. This may be achieved, for example, by means of an adaptive mirror arranged between the collimating lens and the optical focusing unit, in which the adaptive mirror enables an adjustment of the focal position through a variable radius of curvature. However, the adjustment range that can be achieved using the adaptive mirror is relatively small. With good imaging quality and with a focusing lens having a focal distance of 200 mm, the adjustment range is, for example, less than 10 mm. Another disadvantage of the adaptive mirror is that the resulting structure of the processing head has a complex shape since a linear construction type is not possible in this instance.

As an alternative to using an adaptive mirror, JP 2009226473 discloses that the optical focusing unit may be arranged to be movable in the beam propagation direction in order to adapt the focal position in accordance with a focal point diameter change. However, movement of the optical focusing unit requires precise guiding elements and sealing elements in order to be able to hermetically seal the optical compartment during movement of the optical focusing unit. These requirements can result in a complex beam guiding system structure. In addition, the gas pressure present at the side of the optical focusing unit facing away from the optical compartment can make movement of the optical focusing unit difficult.

SUMMARY

The present disclosure relates to beam shaping units that enable, in various implementations, flexible adjustment of the focal point diameter and the focal position, as well as expansion of the adjustment region of the focal position, in a technically simple manner in structural terms. The present disclosure also relates to methods for controlling the beam shaping units.

In general, in one aspect, the subject matter of the present disclosure covers a beam shaping unit for focusing a divergent laser beam for laser material processing onto a workpiece, in which the beam shaping unit has a first optical element, a second optical element arranged downstream of the first optical element in the propagation direction of the beam, an optical focusing unit arranged downstream of the second optical element in the propagation direction of the beam, a first focal point adjustment device for adjusting a focal point diameter of the beam by manipulating the first optical element, and a second focal point adjustment device for adjusting a focal position of the beam by manipulating the second optical element, in which the laser beam is imaged by the first optical element through an intermediate focal point on the second optical element.

Because the intermediate focal point is located between the first optical element and second optical element, the focal point diameter may be varied over a greater range. In some implementations, the first optical element is constructed as a transmissive optical element, such as, for example, a lens. The lens can have a focal distance of less than approximately 50 mm, including, for example, a focal distance of less than approximately 40 mm, or a focal distance of approximately 30 mm.

The imaging properties of the first optical element can be modified by moving the first optical element along the optical axis of the laser beam using the first focal point adjustment device in order to adjust the focal point diameter of the laser beam at the processing point. The focal point adjustment device includes a motor or similar drive device for this purpose.

The second optical element also can be constructed as a transmissive optical element, such as, for example, a lens. Using transmissive optical elements in the beam shaping unit, enables the beam shaping unit to have a linear construction, which can reduce the complexity of the beam shaping unit, as well as the amount of structural space the beam shaping unit requires.

In some implementations, the focal position of the laser beam can be modified by moving the second optical element along the optical axis of the laser beam. Movement of the second optical element can be accomplished using the second focal point adjustment device that is associated with the second optical element. Movement of the first and second focal point adjustment device can be carried out together or independently of one other.

Alternatively, in some implementations, a radius of curvature of the second focal point adjustment device, and consequently its imaging properties, can be changed in order to adjust the focal position. The second optical element can include an adaptive lens which is modified by the second focal point adjustment device in order to adjust the imaging properties of the second optical element. For example, by adjusting a pressure applied to the adaptive lens, the radius of curvature of the adaptive lens can be modified.

In order to adjust the focal point diameter and/or the focal position, both the first and the second focal point adjustment device can be controlled by a control unit, in accordance with predetermined, application-specific set values and current correction values. The current correction values are based on, for example, measurement data of a process monitoring system. Application-specific set values refer to beam properties that are adjusted for a specific processing operation. These values optionally also take into account or compensate for the interactions between the focal point diameter and focal position resulting from the adjustments. In contrast, current correction values can be obtained during the operation of the beam shaping unit, for example, based on thermally induced modifications of the imaging properties of the individual components of the beam shaping unit, as well as based on changes in a working distance between the beam shaping unit and the workpiece. A corresponding control unit can be an integral component both of the beam shaping unit and also of peripheral components. For example, the control unit can be a part of a laser processing machine that contains the beam shaping unit.

In some implementations, the beam shaping unit includes a housing that is divided into chambers by the first optical element, the second optical element, and the mounts of the first optical element and the second optical element, and overflow channels that allow an exchange of gas and pressure between the chambers. This takes into account the fact that clean room conditions should be present where possible in the region of the beam shaping unit as far as the optical focusing unit. Movement of the first and/or the second optical elements causes changes in the volume of the chambers delimited by the optical elements and would result in either reduced or excess pressure without the overflow channels.

In some implementations, the beam shaping unit is integrated in a processing head of a laser processing machine, such as, for example, a laser cutting machine, or forms at least an integral component of the processing head. An additional optical element, such as, for example, a protective window (e.g., planar glass) can be arranged between the optical focusing unit and the workpiece to be processed. The additional optical element can be used to seal the beam shaping unit against gas pressure. The additional optical element, such as the protective glass in the form of a plane-parallel (e.g., glass) window, can be retained in the beam shaping unit or the processing head. As a result, the beam shaping unit can be sealed against gas pressure. In addition, the protective window, which faces the area in which the workpiece processing occurs also can be exchanged or cleaned without the laser beam having to be re-centered.

In some implementations, the beam shaping unit includes a collision protection system that further includes a disconnecting point between the optical focusing unit and the additional optical unit. The part of the beam shaping unit where the disconnecting point is located is covered by a resilient bellows. The collision protection system enables separation between the retention member of the additional optical unit (e.g., protective glass) and the optical focusing unit in the event of overload. The region in which the separation is carried out is surrounded in this instance by a resilient bellows, for example, in the form of a folded bellows, so that, in the event of separation, no particles can enter the region between the additional optical unit (e.g., protective glass) and the optical focusing unit or settle on the optical focusing unit.

The beam shaping unit may be used in laser processing machines whose laser beam source is a solid state laser, such as, for example, a laser having a laser wavelength in the near-infrared range of approximately 1 µm. In some implementations, the supply of the laser radiation from the laser beam source to the beam shaping unit or to the processing head is carried out using a transport fiber. The first optical element of the beam shaping unit is located in the beam expansion propagation downstream of the transport fiber so that the laser beam strikes the first optical element in a divergent manner.

Another aspect of the disclosure relates to a method for controlling the beam shaping unit, in which the focal point adjustment devices are controlled in accordance with application-specific set values. In some implementations, current correction values are taken into account when the focal point adjustment devices are controlled.

In some implementations, a control unit is provided, in which the control unit specifies, for the first and second focal point adjustment device, control signals to adjust the first and/or second optical element in order to produce a desired beam property at the processing point based on a change in focus. To this end, the control unit uses both application-specific set values and current correction values. As explained above, the application-specific set values relate to beam properties to be adjusted for a specific processing task, and optionally take into account interactions between the focal point diameter and focal position resulting from the adjustments. In order to compensate for the interactions, the control unit may use, for example, stored sets of characteristics or functional relationships. In some implementations, a compensation operation may be carried out only when defined limit values are exceeded. The current correction values, which also can be taken into account, result from measurement data of a process monitoring system that may be provided with the system. Alternatively, or in addition, the current correction values can be based on characteristic line sets which are dependent, for example, on the radiation power and the duration of irradiation.

In some implementations, the current correction values are used to compensate for thermally induced imaging errors of the beam shaping unit. The thermally induced imaging errors can occur with increased irradiation time of the optical components and/or with the contamination of the optical components. Such errors can lead to undesirable modification of the focal position. In some implementations, when determining the correction values and corresponding control signals in order to control the focal point adjustment devices, the known interactions between the focal point diameter and the focal position when at least one of the focal point diameter or the focal position is changed can also be taken into account.

In some implementations, the current correction values are established based on the irradiation duration and the laser power supplied to at least one optical component of the beam shaping unit. The thermally induced imaging errors are stored in accordance with the laser power and irradiation duration, for example, in the control unit.

Alternatively, in order to determine the current correction values, a temperature measurement of at least at one of the optical components of the beam shaping unit can be performed. The measured temperature can be correlated with a corresponding thermally induced imaging error. In some implementations, the temperature at the center of at least one optical component is determined. The measurement can optionally be performed using a contactless measurement means (e.g., heat sensors) known to the person skilled in the art.

In some implementations, only the temperature of the last optical component (e.g., the optical focusing unit or the protective window) in the propagation direction of the laser beam is measured. The correction value calculated as a result of the measurement can take into account the focal position displacement due to the laser power and irradiation duration with respect to the absorption of the protective glass, as well as the increased absorption of the protective window (e.g., glass) due to process-related contamination. The monitoring of the protective window, which determines the degree of contamination via the temperature measurement, may also be used to ensure that the process is switched off when a previously defined limit value is reached. By means of additional signal analysis (see above), the temperature measurement value can be used for focal position adjustment.

In some implementations relating to thermally induced imaging errors, the current correction value refers primarily to the focal position, such that the control signal used for compensation need only be transmitted to the second focal point adjustment device.

Other advantages will be appreciated from the description and the drawings. The features mentioned above and those set out in greater detail below can also be used individually or together in any combination. The embodiments illustrated and described are not intended to be understood to be a definitive listing but are instead of exemplary character in order to describe the invention.

DETAILED DESCRIPTION

Figure 1A:
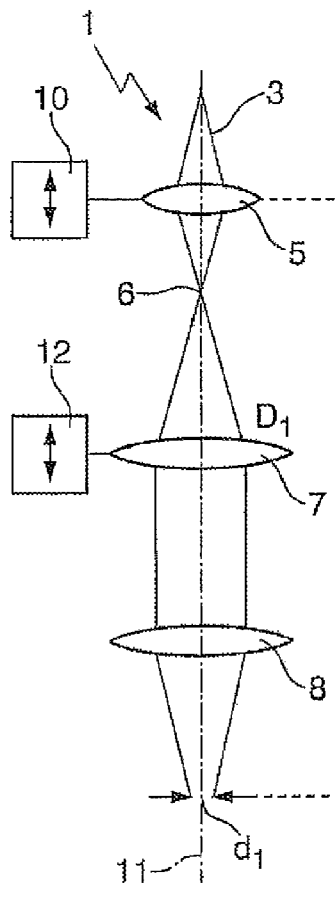
FIGS. 1a, 1b and 1c are schematic illustrations of examples of a beam shaping unit with three different settings of the focal point diameter or the focal position.

FIG. 1a is a schematic illustration of the operating principle of an inventive beam shaping unit 1. In this example, a divergent laser beam 3 strikes a first lens 5 having a short focal distance (e.g., smaller than approximately 50 mm and greater than 0 mm, such as, for example, approximately 40 mm, or approximately 30 mm) and is imaged by means of an intermediate focal point 6 onto a second lens 7 (having a beam diameter D1 at the second lens 7). The laser beam 3 collimated by the second lens 7 is focused by means of an additional lens (e.g., a fixed lens), which acts as an optical focusing unit 8, onto a workpiece surface 9 for laser material processing. The laser focal point formed at the processing point on the workpiece surface 9 has a diameter d1 in this example.

When the application is changed (for example, when changing to another sheet thickness or to another workpiece material to be cut (e.g., metal sheets)), it may be necessary to modify the focal point diameter d1 on the workpiece surface 9 and, for example, to select a smaller focal point diameter d2 (<d1).

For variable adjustment of the focal point diameter, a first focal point adjustment device 10 is provided on the beam shaping unit 1, in which the first focal point adjustment device 10 (e.g., using a drive (not illustrated) such as a linear motor), can move the first lens 5 along the optical axis 11 of the laser beam 3.

Figure 1B:
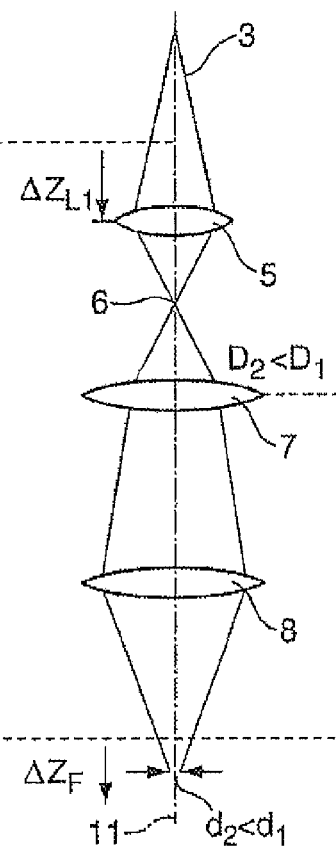

As shown in FIG. 1b, by displacing the first lens 5 in the beam propagation direction of the laser beam 3 along the optical axis 11 a distance of $\Delta Z_{L1}$, the beam diameter of the laser beam 3 striking the second lens 7 can be reduced (D2<D1). The displacement $\Delta Z_{L1}$ of the first lens 5 is selected so that the reduction of the beam diameter at the second lens 7 (from D1 to D2) produces the desired reduction of the focal point diameter (from d1 to d2).

Figure 1C:
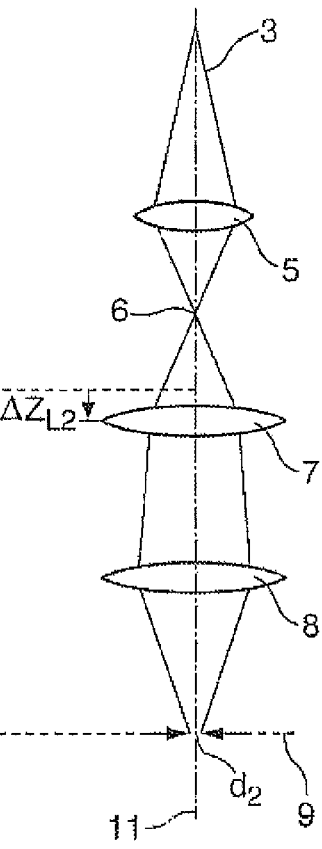

FIG. 1b also shows that the displacement of the first lens 5 leads to a focal point displacement $\Delta Z_F$ in the beam propagation direction of the laser beam 3. In order to compensate for the focal point displacement $\Delta Z_F$ and to position the laser focal point at the workpiece upper side 9 again, a second focal point adjustment device 12 is used to displace the second lens 7 in the beam propagation direction along the optical axis 11 of the laser beam 3 by a value $\Delta Z_{F2}$. The displacement $\Delta Z_{F2}$ is selected such that the focal position again corresponds to the processing position at the workpiece upper side 9, as illustrated in FIG. 1c. In this example, although the modification of the position of the second lens 7 leads to a modification of the focal position, it does not influence the focal point diameter d2. If the second lens 7 is an adaptive lens (e.g., with an adjustable radius of curvature), the focal point displacement $\Delta Z_F$ may, alternatively or in addition to a displacement of the second lens 7, also be compensated by using the second focal point adjustment device 12 to adjust the curvature of the second lens 7 in an appropriate manner.

Figure 2:
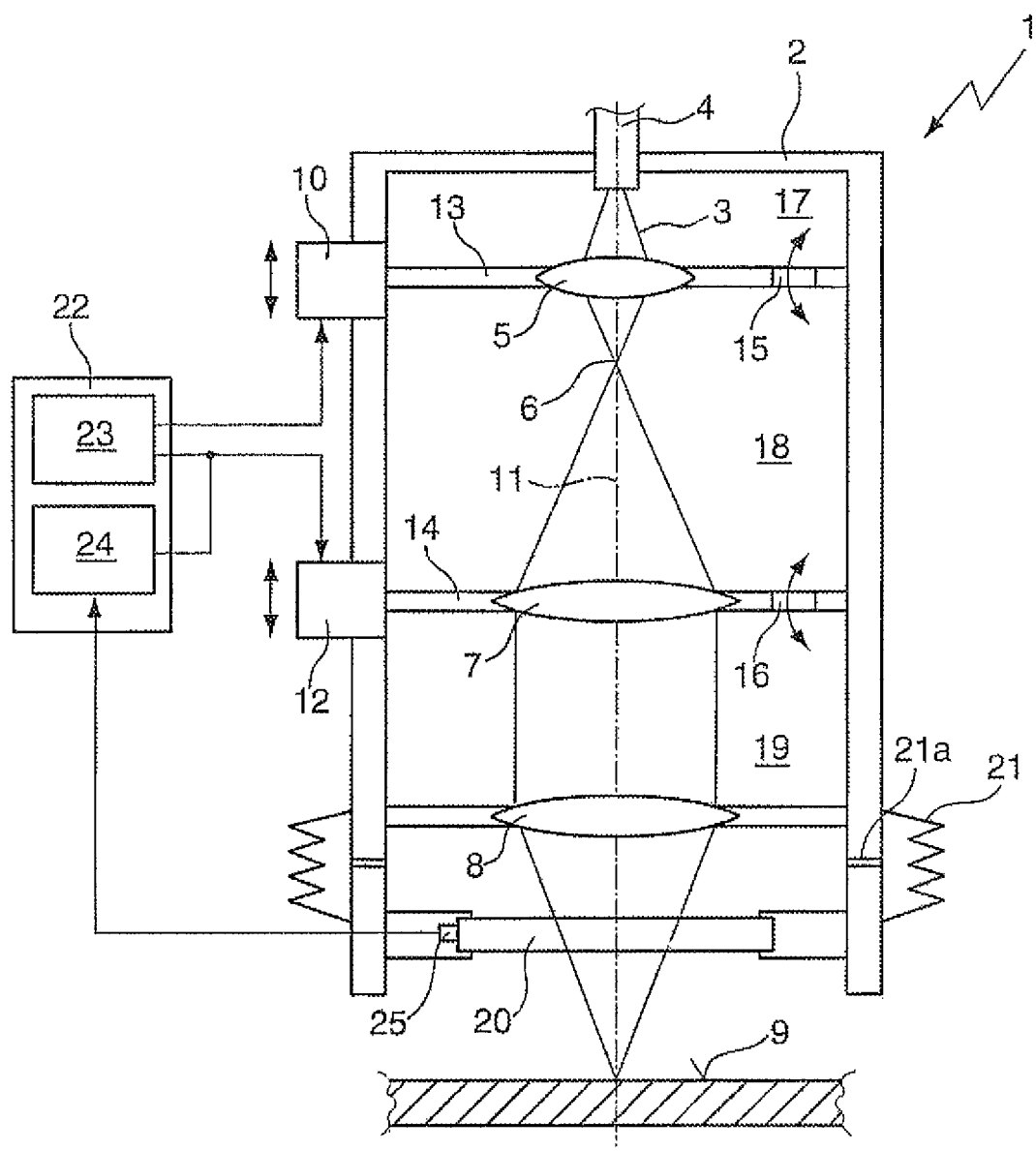
FIG. 2 is a schematic illustration of a beam shaping unit integrated in a housing.

FIG. 2 is a schematic illustration of an example of the beam shaping unit 1 assembled in a housing 2 into which the laser beam 3 is coupled from a transport fiber 4. The laser beam 3 exits the transport fiber in a divergent manner and can have, for example, a laser wavelength in the near-infrared range, e.g., approximately 1 µm. In addition to the focal point adjustment devices 10, 12, lens mounts 13, 14, which guide the first lens 5 or the second lens 7 during the displacement along the optical axis 11 of the laser beam 3, are also shown in FIG. 3. The lens mounts 13, 14 terminate during the movement of the lenses 5, 7 in a sealing manner with the housing 2 so that the two lenses 5, 7 together with the lens mounts 13, 14 delimit three chambers 17, 18, 19. The lens mounts 13, 14 that guide the first or second lens 5, 7 have overflow channels 15, 16, which ensure pressure compensation between the chambers 17, 18, 19 when the lenses 5, 7 are moved.

The beam shaping unit 1 has a protective pressure window 20 (e.g., glass window) arranged downstream in the beam propagation direction of the optical focusing unit 8. A collision protection system implemented in a control unit 22 can trigger a collision-related separation at a disconnecting point 21a in the region between the optical focusing unit 8 and the protective pressure window 20. A folded bellows 21 is fitted around this region to the housing 2 of the beam shaping unit 1 and prevents the penetration of dirt particles which might be deposited on the optical focusing unit 8.

The adjustment of the focal position and the focal point diameter by the focal point adjustment devices 10, 12 is controlled based on control signals predetermined by the control unit 22. These control signals are determined based on application-specific set values 23 and current correction values 24. The control signals determined by the set values 23 are transmitted both to the first and to the second focal point adjustment device 10, 12 and converted into corresponding movements of the first or the second lens 5, 7. With respect to the current correction values, the example illustrated in FIG. 2 is based on compensation of thermally induced imaging errors. In some implementations, thermally induced imaging errors substantially influence the focal position such that a control signal for compensating the focal point displacement needs only be transmitted to the second focal point adjustment device 12.

In some implementations, it is possible to compensate the focal position displacement based on current correction values only when defined limit values have been exceeded. In this manner, it is possible to prevent the lenses 5, 7 from having to be moved when only small changes of the focal position occur. The current correction values, which are taken into account, can be produced from measurement data from a process monitoring system. An example of the process monitoring system is illustrated in FIG. 2 by a temperature sensor 25 which monitors the temperature of the protective glass 20. The temperature determined by the temperature sensor 25 is correlated in the control unit 22 with a corresponding thermally induced imaging error. The current correction value 24 for correcting the focal position is then calculated from the foregoing correlation.

Alternatively or in addition, in order to determine the current correction values 24, the control unit 22 may also use load-dependent characteristic line sets, in which the thermally induced imaging errors of the beam shaping unit 1 or individual components of the beam shaping unit 1 are stored in accordance with the laser power and duration of irradiation. Due to a combination of the load-dependent characteristic lines with the temperature measurement, it is possible to determine the contamination of the protective glass 20, and to take into account the effect of the contamination when determining the current correction value 24 for focal position adjustment. In a variant not illustrated in greater detail, the current correction value 24 may also act as an input value for the calculation of the application-specific set value 23.

A number of embodiments have been described. Nevertheless, it will be understood that various modifications may be made without departing from the spirit and scope of the invention. Accordingly, other embodiments are within the scope of the following claims.

What is claimed is:

1. A beam shaping unit for focusing a divergent laser beam onto a workpiece, the beam shaping unit comprising:
    an optical fiber to deliver a divergent laser beam;
    a first optical element arranged to receive the divergent laser beam from the optical fiber;
    a second optical element arranged downstream of the first optical element to receive the laser beam from the first optical element;
    an optical focusing unit arranged downstream of the second optical element to receive the laser beam from the second optical element;
    a first focal point adjustment device coupled to the first optical element, wherein the first focal point adjustment device is configured to adjust a focal point diameter of the laser beam by manipulating the first optical element; and
    a second focal point adjustment device coupled to the second optical element, wherein the second focal point adjustment device is configured to adjust, in a propagation direction of the laser beam, a focal position of the laser beam by manipulating the second optical element, wherein the laser beam is imaged by the first optical element through an intermediate focal point onto the second optical element.

2. The beam shaping unit according to claim 1, wherein the first optical element comprises a lens.

3. The beam shaping unit according to claim 2, wherein the lens has a focal length of less than about 50 mm and greater than about 0 mm.

4. The beam shaping unit according to claim 1 wherein the first focal point adjustment device is operable to adjust a position of the first optical element along an optical axis of the laser beam, whereby a size of the focal point diameter of the laser beam varies with adjustment of the first optical element position.

5. The beam shaping unit according to claim 1, wherein the second optical element comprises a lens, and wherein the second focal point adjustment device is operable to adjust at least one of a position or a shape of the second optical element, whereby the focal position of the laser beam varies with an adjustment of at least one of the position or shape of the second optical element.

6. The beam shaping unit according to claim 1, comprising a control unit operable to control at least one of the first focal point adjustment device or the second focal point adjustment device in accordance with predetermined application-specific set values and current correction values, wherein the current correction values are based on measurement data of a process monitoring system.

7. The beam shaping unit according to claim 1, further comprising:
    a housing, wherein the housing is divided into chambers by the first optical element, the second optical element, and mounts of the first and second optical elements; and
    overflow channels arranged to provide gas and pressure exchange between the chambers.

8. The beam shaping unit according to claim 1, further comprising an additional optical unit arranged downstream of the optical focusing unit in the propagation direction of the beam, wherein the additional optical unit seals the beam shaping unit against gas pressure.

9. The beam shaping unit according to claim 1, wherein the first focal point adjustment device is further configured to displace a focal position in the propagation direction of the laser beam by manipulating the first optical element,
    and wherein the second focal point adjustment device is configured to compensate for the displacement of the focal position by manipulating the second optical element, and
    wherein the focal point diameter is not influenced by manipulating the second optical element.

* * * * *